(12) United States Patent
Long (10) Patent No.: US 6,879,076 B2
(45) Date of Patent: Apr. 12, 2005

(54) ELLIPSOID GENERATOR

(76) Inventor: Johnny D. Long, 3305 Tazewell Pike Apt. 1, Knoxville, TN (US) 37918-2521

( * ) Notice: Subject to any disclaimer, the term of this patent is extended or adjusted under 35 U.S.C. 154(b) by 0 days.

(21) Appl. No.: 10/733,519

(22) Filed: Dec. 9, 2003

(65) Prior Publication Data

US 2004/0124729 A1 Jul. 1, 2004

Related U.S. Application Data

(60) Provisional application No. 60/431,755, filed on Dec. 9, 2002.

(51) Int. Cl.[7] .................. H02K 21/14; H02K 7/12; H02K 21/12
(52) U.S. Cl. .................. 310/156.38; 310/194; 310/254
(58) Field of Search .................. 310/178, 156.38, 310/89, 90, 166, 184, 261, 254, 194, 43

(56) References Cited

U.S. PATENT DOCUMENTS

| | | |
|---|---|---|
| 3,178,600 A | 4/1965 | Bers |
| 4,227,164 A | 10/1980 | Kitahara |
| 4,538,083 A | 8/1985 | Nozawa |
| 4,661,737 A * | 4/1987 | Barri .................. 310/166 |
| 4,719,381 A | 1/1988 | Miles |
| 4,739,241 A | 4/1988 | Vachtsevanos et al. |
| 4,795,929 A | 1/1989 | Elgass et al. |
| 5,204,570 A | 4/1993 | Gerfast |
| 5,413,010 A | 5/1995 | Nakanishi et al. |
| 5,486,728 A * | 1/1996 | Hirama .................. 310/40 MM |
| 5,798,590 A | 8/1998 | Sakakibara |
| 5,808,395 A | 9/1998 | Anders et al. |
| 6,326,714 B1 | 12/2001 | Bandera |

FOREIGN PATENT DOCUMENTS

| | | | | |
|---|---|---|---|---|
| JP | 357199439 | * | 12/1982 | .................. 310/217 |
| JP | 358019154 | * | 2/1983 | .................. 310/49 R |
| JP | 363268458 | * | 11/1988 | .................. 310/92 |
| JP | 401030449 | * | 2/1989 | .................. 310/80 |
| WO | WO 98/58411 | * | 12/1998 | .................. 310/261 |

* cited by examiner

Primary Examiner—Tran Nguyen (57) ABSTRACT

A dynamoelectric device that is highly adaptable to a broad range of applications while providing robust output and energy conversion. The magnetic pole faces of the rotor lie in an ellipsoid. With or without a rotor shaft, the device allows options of either physical connection or contact-less, magnetic coupling. Surrounding the rotor is a brush-less stator having a bobbin-type, axial-centered coil conductor that provides a total capture of magnetic flux emanating from a rotor having an entire surface area of uniform flux density. Devices without a rotor shaft, and those having an air gap filled with ferrofluid, provide a two part generator with remarkable efficiency that is easily waterproofed and mechanically stable.

20 Claims, 8 Drawing Sheets

1.67 Hz (100 RPM)

| LOAD | Vpp | Ipp | Ppp | VRMS | IRMS | PRMS |
|---|---|---|---|---|---|---|
| Inf | 12 | | | 8.5 | | |
| 1K OHM | 10 | 10ma | 100mw | 7.1 | 7.07E-03 | 5.00E-02 |
| * 100 OHM | 5 | 50ma | 250mw | 3.5 | 3.54E-02 | 1.25E-01 |
| 50 OHM | 3 | 60ma | 180mw | 2.1 | 4.24E-02 | 9.00E-02 |
| 10 OHM | 1 | 100ma | 100mw | 0.7 | 7.07E-02 | 5.00E-02 |
| 1 OHM | 0.1 | 100ma | 10mw | 0.1 | 7.07E-02 | 5.00E-03 |

Fig. 16

ELLIPSOID GENERATOR

CROSS REFERENCE TO RELATED APPLICATIONS

This application claims the benefit of U.S. Provisional Application No. 60/431,755, filed Dec. 9, 2002.

STATEMENT REGARDING FEDERALLY SPONSORED RESEARCH OR DEVELOPMENT

Not Applicable.

BACKGROUND OF THE INVENTION

1. Field of Invention

The invention pertains to coils, permanent magnet rotors, rotating and pivoting means for rotors of generators and motors, and means for accelerating the rotor or stator of these devices.

A dynamo-electric device has a brush-less, substantially iron-less stator of bobbin-type coil structure axially centered and surrounding the rotor, closely approximating the contour of the ellipsoid or spherical, permanent magnet rotor. The rotor includes a permanent magnet having at least one north and south pole face as sectors of the ellipsoid shape having stable and substantially uniform flux density across the entire surface area of the rotor. Such devices need not include a shaft, having means for suspending, supporting, and accelerating the rotor, including magnetic coupling to various external devices. In some embodiments the rotor is allowed multiple degrees of freedom with means for causing the rotor to rotate, reciprocate, or oscillate continuously or intermittently.

2. Description of Related Art

In many motors and generators the stator comprises a coil and the rotor comprises a permanent magnet. Usually coils are wound on stacks of laminated steel that faces the flux of the permanent magnet. Those skilled in the art are familiar with the associated problems of iron and heat losses, eddy currents, fringing flux, cogging, and noise.

Also, prior art shows examples of spherical motors. In U.S. Pat. No. 5,413,010 (Nakanishi et al.), a spherical electric motor is shown whereby a lattice-shaped array of magnets along a series of intersecting lines are embedded in a shell surface. In U.S. Pat. No. 3,178,600 (Bers), and in U.S. Pat. No. 5,204,570 (Gerfast), spherical motors are shown having spirally-wound, cup-shaped coils.

Other prior art shows motors that utilize a bobbin-type, or axial-centered coil. Over the years small, relatively compact motors and actuators have been used in cameras, from Uchiyama; 1973, to Matsumoto; 2002. Bobbin-type coils have been constructed to surround a permanent magnet rotor in the shape of a cylinder whereby a rotor has magnetic poles placed on a line extending in a magnetic direction. Such motors have been used to control shutter blades in cameras and various methods have been employed to connect operating members and linkages. In such devices, to accommodate the mechanics, the air gaps between the rotors and stator tend to be excessive and the entire surface areas of these shapes are not utilized.

Included in discussions of motors and the literature there is often a reminder that a motor can also be used as a generator or alternator. This is generally true if the shaft of a motor is turned fast enough. However, efficiency and output has no direct correlation in such uses. The dynamics and physical geometries of magnetic flux in an "active" state and a "passive" state produce different results and are based on entirely different phenomena. An energized coil in the case of a motor having a driving current will produce a magnetic field which may then be used to torque a rotor. In the "passive" state as represented by a generator, magnetic flux must sweep by a non-energized coil structure to induce a current. The laws of induction apply in contrast to the methods for producing torque in permanent magnet motors whereby two magnetic fields are caused to react with one another.

Regarding induction, it is known that moving a magnetic pole face and associated flux across a conductor at a ninety degree angle induces current to flow through the conductor; and alternately, by moving a magnet passed a coil a flux differential causes current to flow in a circuit. Usually, iron cores are added to the coils because the geometries of most generators are not able to place coils effectively in the path of rotating flux. Without the iron cores, most of the flux would bend around the coils instead of passing through them since magnetic flux will seek a path of least resistance. The addition of iron to the coils is to capture and direct the magnetic field lines in a linear direction as the rotor spins passed the coils; and so, such construction can be viewed as a series of linear alternators having coils that extend increasingly at a distance from the source of flux and magnetic flux that additionally decreases in density with distance. This is why linear alternators are mostly inefficient. Also, additional torque is required to move the magnet beyond its natural attraction to the iron.

Prior art coils that do not use the addition of iron cores suffer by geometry the previously stated rule of induction. Magnetic flux must cross a conductor at an optimal ninety degree angle to efficiently induce current and only those sections of a coil so disposed will produce significant current. Those large areas of a coil that are aligned with the direction of moving flux field lines produce no current and only serve as conductors to continue the circuit. For these reasons the shape and placement of a coil, the shape and placement of magnetic flux, and the relative movement between the two become important factors in generator output.

As electronic and power consuming devices become smaller, there arises the need for compact, high-output devices for charging and driving them by way of efficient energy conversion. Much time and study has been spent analyzing various methods for harvesting the energy of everyday human motion and using it to power mobile devices. Also, a few alternative powered products have been developed. Summaries and conclusions in the prior art, however, have expressed the shortcomings that are present. For example, work that has been done to provide a generator in the sole of a shoe has involved attempts at utilizing a small gear box to accelerate at the necessary speed a small dc motor as a generator. Outputs of such have been minimal and the friction and wear characteristics of the various mechanical elements are of major concern. Other attempts have utilized piezo, linear coils, and electrostrictive polymers. These have yielded even less results. A suitable generator for micro-scale devices has not been achieved and the various studies and attempts have left open a call for more improvements. A robust, modular generator capable of efficient motion and energy conversion can solve these and other issues including transcutaneous power transmission, motion conversion in marine or hermetic environments, etc. Large-scale devices are also possible. Needs exist for military and space applications as well as industrial and consumer markets.

BRIEF SUMMARY OF THE INVENTION

The present invention applies to the shape and placement of a coil or conductor, the shape and placement of a permanent magnet rotor, rotating and pivoting means for the rotor or stator of the invention, and means for accelerating the rotor or stator of motors and generators of the invention herein described. The invention provides a high out-put, low cost, modular and easily adaptable, efficient energy and motion conversion dynamo-electric device. As a generator or motor, the stator or rotor may be caused to rotate or reciprocate along an axis with or without an axial shaft. Physical connections can be made directly to a rotor magnet or shaft, or connection can be made by magnetic coupling to an additional motor, generator, magnetic material ferrous material, or electromagnetic device. A brush-less, substantially iron-less device produces, without cogging, robust outputs from rotary, reciprocating, oscillating, escapement, or swinging motions. The device does not produce noisy sine waves, does not produce "chopped" sine wave amplitudes common to multi-pole generators, and is easily waterproofed or isolated from environments. The permanent magnet rotor shape provides the maximum flux density possible throughout the surface area. The closely contoured, axial-centered coil conductor, provides a complete capture of flux at the maximum geometry to produce current at all points along the conductor.

The term "ellipsoid" is meant to include spheres, prolate and oblate spheres, spherical or rounded cones, rounded cylinder, egg-shape, or any shape of magnetic material that provides a substantially uniform flux density emanating substantially throughout the surface area of the shape. Also, as weight issues may develop with larger sizes, a hollow magnetic rotor may be utilized.

The term "axial-centered" coil is meant as a bobbin-type coil structure usually supported by a plastic form, or a self-supporting preformed coil, single or multiple wound, that is placed substantially centered as divided by the center of the rotor axis. The continuous coil winding surrounds the rotor outer circumference and is aligned in plane that is parallel to the geometric axis of rotor having rotational axis centered in plane of magnet pole dissection. Additional coils may be applied. For example, another coil may be placed at an angle to the first. A coil may overlap at the point of axis. Additional elements may also be applied. For instance, an electromagnetic element may be placed in the open areas around the device to provide a spherical oscillator or transformer.

Regarding embodiments wherein a permanent magnet rotor does not have a shaft, various methods may be employed to support or suspend the rotor within the stator structure including centering protrusions or indenting, bearings, and the like. A rotor may be suspended within a closed cavity as an integral part of the basic structure utilizing known methods of rotor levitation or suspension such as hydraulic or pneumatic pressure, and passive or active magnetic levitation. At various rotor speeds and loads the rotor exhibits a natural, somewhat passive tendency to self levitate due to the captive qualities of the device. Another useful and advantageous method of suspending the permanent magnet rotor within a spherical closed cavity, usually made of plastic, is to fill the narrow air gap with ferrofluid. Since the air gap dimension of a motor or generator is always important, this method suspends the rotor by magnetic pressure and viscosity while virtually negating the dimensional aspect of an air gap. Without physical contact, an external, magnetically coupled device aligns the permanent magnet rotor in the proper orientation for rotation about the axis. Magnetic coupling to the rotor may be achieved variously by way of a moving, rotating, or pivoting magnetic or ferrous material, or coupling by electro-magnet.

Those familiar with the art understand that the terms rotor and stator may be interchangeable as one or the other may rotate, or both may counter-rotate. Additionally, although the invention is described as being substantially iron-less the addition of such either inside or outside the device will not depart from the spirit of the invention. Various embodiments and uses are anticipated by the present invention but for the sake of brevity only the most basic are shown.

BRIEF DESCRIPTION OF THE SEVERAL VIEWS OF THE DRAWINGS

The above-mentioned features of the invention will become more clearly understood from the following detailed description read together with the drawings in which.

DETAILED DESCRIPTION OF THE INVENTION

A dynamoelectric device is disclosed as generally illustrated in FIGS. 4–7 and FIGS. 9–15. In one embodiment, referring to FIGS. 4 and 5, a permanent magnet rotor 23 of ellipsoid shape has a N and S pole face equally divided along the surface area of the rotor. A stator coil 22 is axially centered and supported by bobbin-type structure 25 that provides an air gap dimension 24 about the rotor which can be filled by various methods with a ferrofluid (not shown) that provides means of rotor support for movement about an axis. A ferrofluid suspends the rotor magnet by attraction to the rotor surface area and provides a mostly uniform pressure gradient between the rotor and the inside wall cavity of the stator body 25.

Figure 1:
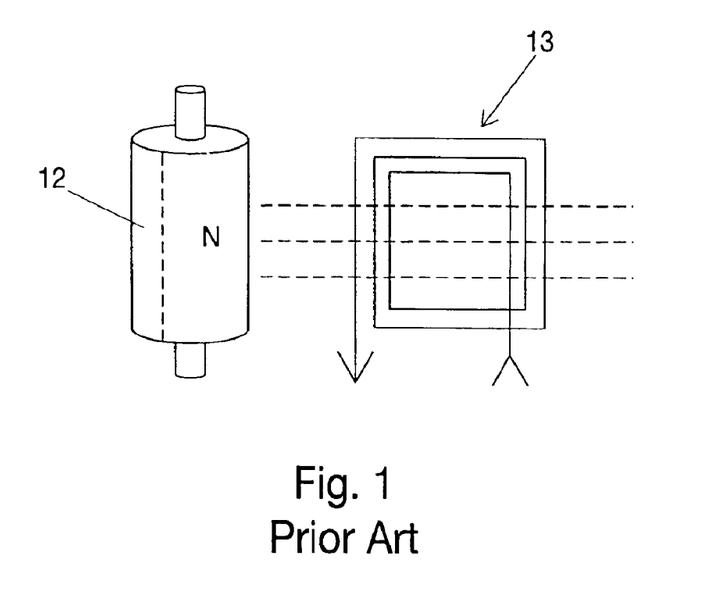
FIG. 1 is an explanatory view showing convention motor or generator magnetic field orientation.
Figure 2:
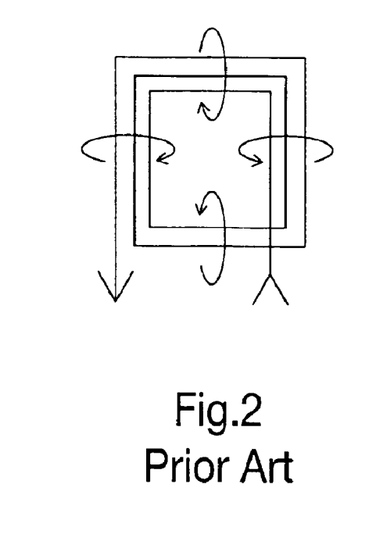
FIG. 2 is an explanatory view showing a coil configuration of FIG. 1 with orientation of magnetic field lines that are present in an energized or "active" state when convention motors are utilized and in contrast to generator functions.
Figure 3:
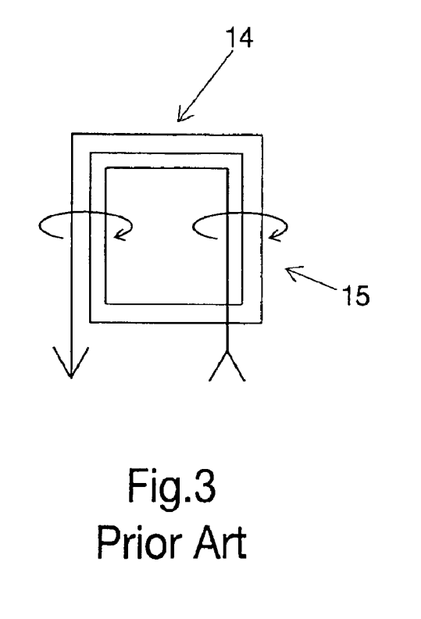
FIG. 3 is further explanatory view of a coil as FIG. 2 in contrast and shown in a "passive" state as a generator function, further showing orientation of field lines as a convention coil is swept by the field lines of a rotor pole face.
Figure 4:
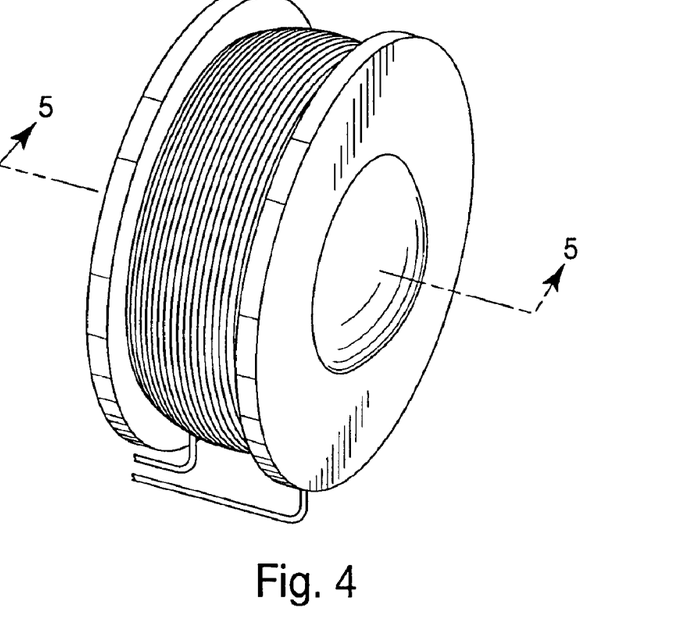
FIG. 4 is a perspective view of the present invention.
Figure 5:
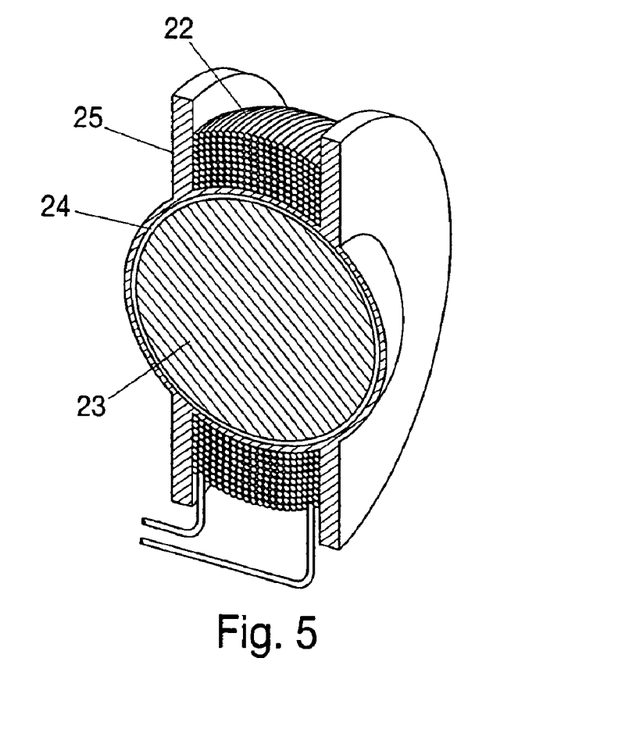
FIG. 5 is a sectional plan view of a first embodiment of the present invention.

In this example the rotor does not have a shaft. When used as a generator, means for accelerating the rotor in relation to the stator is provided by contact-less, magnetic coupling as disclosed with an additional element of either ferrous material (not shown) that is caused to move or hold the rotor position in relation to the stator, or a moving or stationary magnet provides the same, or an electromagnet (not shown) can provide such. Various options for magnetically coupling the device can easily provide the proper orientation of the rotor for movement about an axis. Various pivot means can be utilized for one or the other to accelerate including simultaneous counter-rotation which would increase the relative acceleration exponentially. Such an application, for example, could vastly improve the potential of flywheel batteries and the like where extreme velocities are required.

In other applications of such a device, on a larger scale for example, instead of suspending the rotor by ferrofluid or in conjunction with ferrofluid, a rotor can be suspended for support within the cavity by other various means including pneumatic or hydrostatic pressure, or by active or passive magnetic levitation as known in the art and such methods may also provide rotor acceleration within the cavity. By further example of applications, in micro-gravity environments the weight of the rotor would be negated and forces necessary to suspend and accelerate the device would relate only to inertia mass.

Referring back to FIGS. 4 and 5, it is clear that this construction can be easily waterproofed or sealed from adverse environments. The problem of shaft seal penetrations is eliminated. By enclosing the device in an additional housing or by bonding a cap along the top edges of the sidewall flanges as seen integral to 25, this and other methods would provide a hermetically sealed unit.

Figure 6:
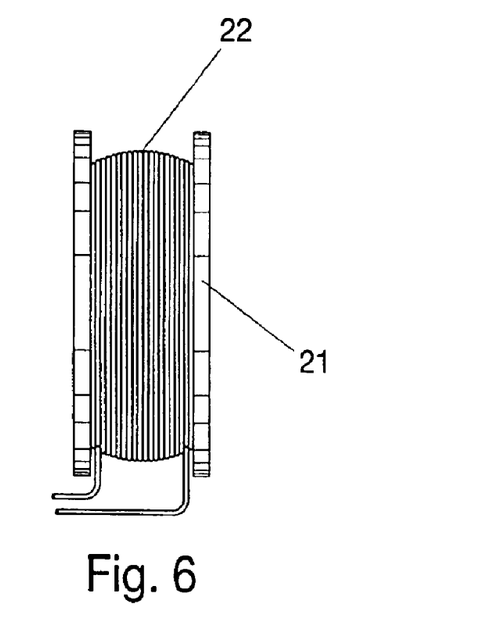
FIG. 6 is a side view of a bobbin-type coil structure in which a bobbin frame is utilized.
Figure 7:
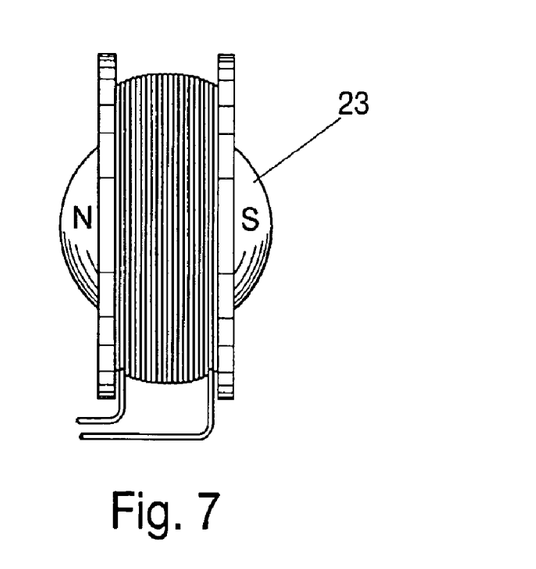
FIG. 7 is a side view as FIG. 6 further showing a spherical permanent magnet rotor interposed within the coil structure.
Figure 12:
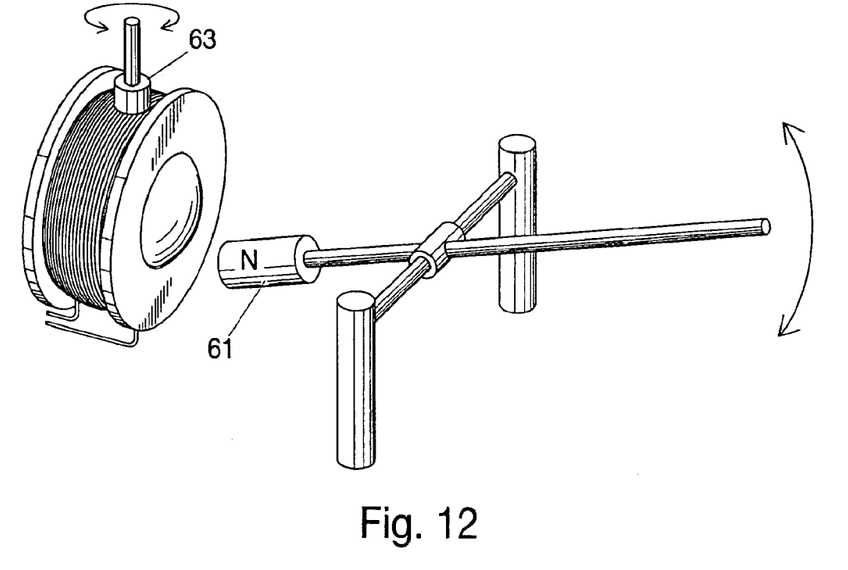
FIG. 12 shows a perspective plan view of a magnetically coupled, moving magnet.

In FIGS. 6 and 7, a sealed enclosure is not utilized. The coil 22 is supported by a bobbin stator housing 21 (plastic) which is contoured as support means for the rotor 23. This example also shows a rotor having no shaft, however a non-extending shaft can be attached and contained within the stator housing 21. For applications of the invention requiring an extended shaft, a sleeve portion 63 as shown in FIG. 12 or a split sleeve construction 64 as shown in FIG. 8 provides a throughway for a shaft and protects the coil winding from abrasion with the shaft.

Figure 8:
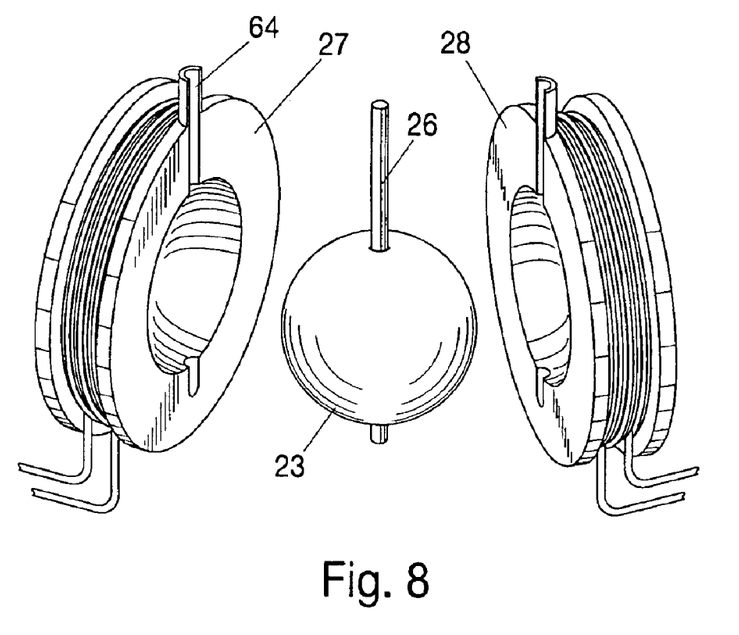
FIG. 8 is a perspective view of an alternate embodiment showing two coil bodies constructed for mutual abutement around a permanent magnet rotor of the invention having an extended shaft that protrudes beyond the coil structures.
Figure 9:
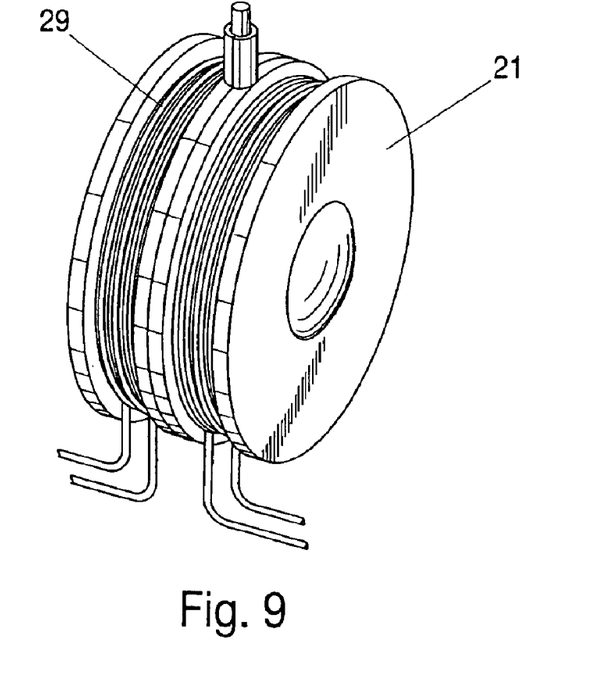
FIG. 9 is a construction view as FIG. 8 showing the two coil bodies as attached whereby the two are representative of the substantially centered coil arrangement.

The shaft 26 in FIG. 8 is attached to the rotor magnet 23 and extends beyond the stator coil bodies 27 and 28 which are two halves of a bobbin coil structure. The two combine to make a substantially centered coil arrangement as seen in FIG. 9. In these examples a shaft 26 as seen in FIG. 8 or as seen in FIG. 12 protruding through a sleeve 63 provides support and pivot means. An extended shaft also provides acceleration means for the rotor or stator.

Figure 10:
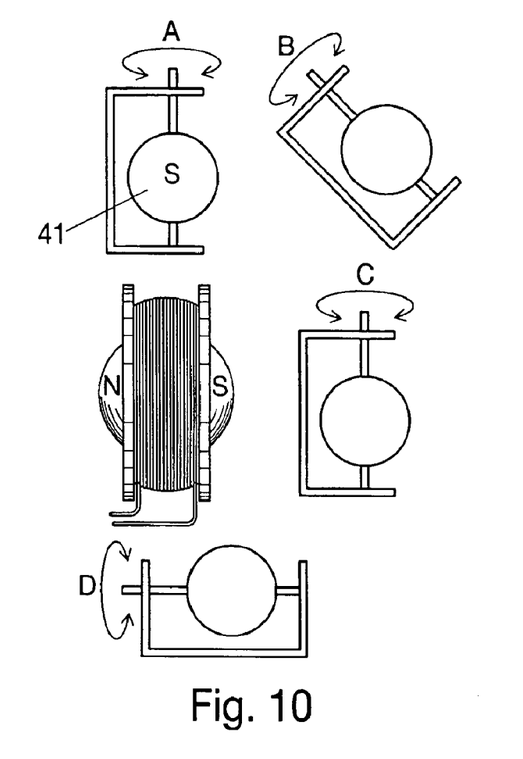
FIG. 10 is an explanatory side view plan showing various means and orientations of external devices that are magnetically coupled as described by the invention.

FIG. 10 is an explanatory side view plan showing various orientations of externally and magnetically coupled devices as disclosed by the invention. A moving magnet 41 is shown rotatable and is magnetically coupled to the rotor of a dynamoelectric device of the present invention, such being achievable at various orthogonal planes as indicated by examples A, B, C, and D. In this view plan, consider two embodiment examples described; one comprising stator and rotor without a shaft and another comprising stator and rotor with a shaft, and either embodiments with external magnetic coupling to rotatable magnet devices selectable at various rotation angles relative as indicated by positions A, B, C, and D. In a case where the rotor 23 of the dynamo-electric device is provided with an axial shaft, not visible in this drawing because it is contained within the stator, the shaft is axially centered and parallel with surrounding coil plane, and any of selectable external and magnetically coupled rotatable magnet positions shown can be utilized to urge rotor along its proper axis orientation with the coil. In the example, however, where rotor 23 does not include a shaft and wherein rotor would otherwise be free-floating, only positions A or C are capable of providing the correct axial orientation of the rotor 23 with the coil.

Figure 11:
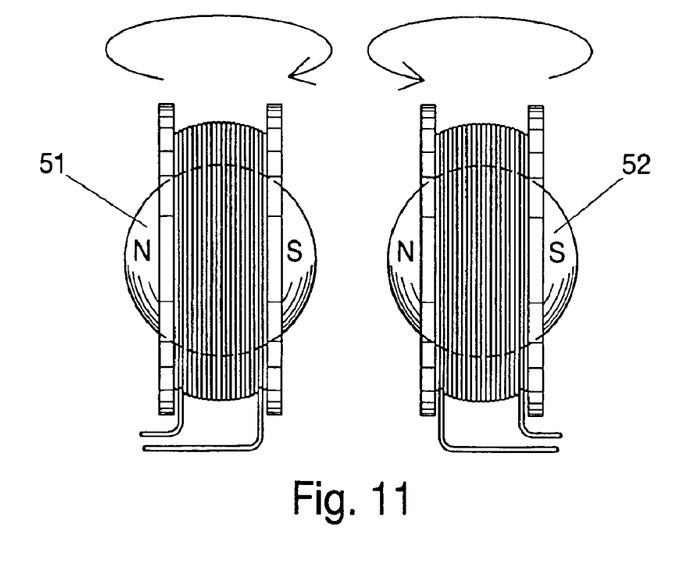
FIG. 11, similar as FIG. 10 shows two identical devices of the invention that are magnetically coupled as a modular grouping and having dual output potentials.

Similar as FIG. 10, in FIG. 11 it can be understood that the two magnetically coupled devices of the invention can also be arranged variously as shown in FIG. 10 and that further, the associated coil structures may be turned at angular positions to one another without disrupting the coupling of the rotor magnets 51 and 52. Here, rotor magnets 51 and 52 are representative of two rotor magnets 23 as magnetically coupled device grouping. With such an arrangement the production of multiple phase current output is achievable. Another method for such would be to combine a series of units all sharing a common shaft or shaft arrangement, or common gearing of shafts.

Figure 13:
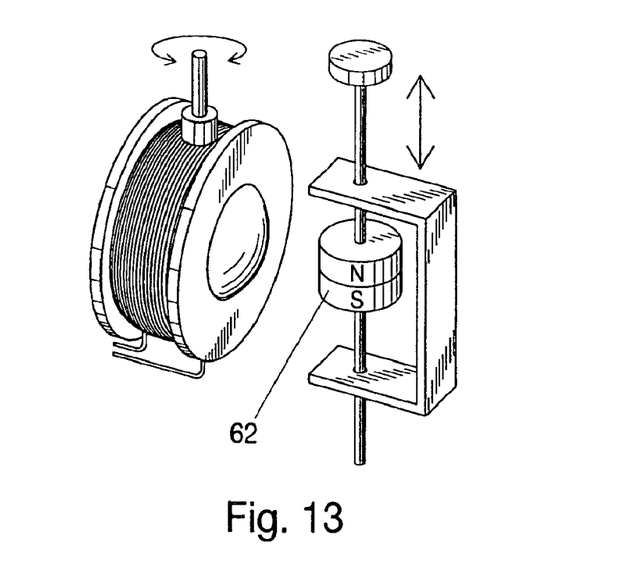
FIG. 13 is a plan view similar to FIG. 12 showing a magnetically coupled, moving magnet.

FIG. 12 shows a perspective plan view of a magnetically coupled, moving magnet 61 as similarly shown 62 in FIG. 13.

Figure 14:
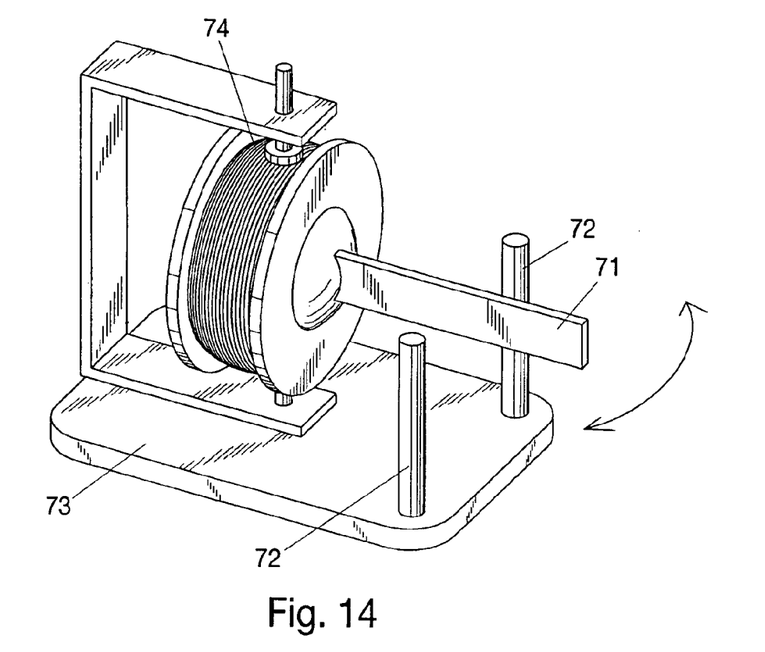
FIG. 14 is a plan view, alternative embodiment of the invention having an extended member and mounted travel stops for limited relative movement between the rotor and stator of the invention.

FIG. 14 is a plan view of an alternative embodiment of the invention having an extended member 71 that is connected to the rotor magnet of the device having a coil 74 wound on a pivotally mounted stator bobbin. Travel stops 72 mounted to a base frame 73 limit the travel distance of the rotor.

Figure 15:
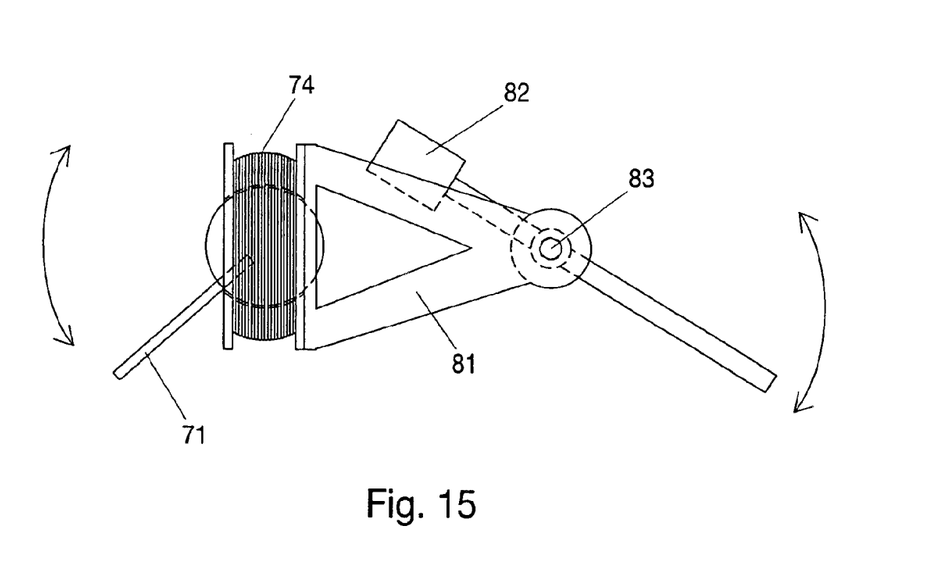
FIG. 15 is a sectional plan view of another alternative embodiment of the invention showing increased relative travel between a magnetically coupled device having connection to a coil structure of the invention and the rotor having an extended member.

FIG. 15 is a sectional plan view of an alternative embodiment showing increased relative travel between extended member 71 and another attached to a moving magnet 82 that is pivotal at 83 by an extended member 81 connected to the stator body that is surrounded by the coil 74.

Figure 16:
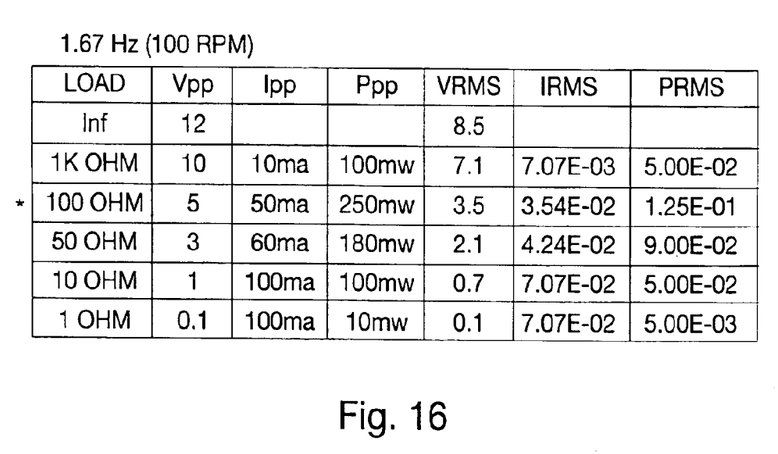
FIG. 16 is a load table of test results performed on a hand-made model of the invention showing the significant outputs achieved even without the advantages of close tolerance machining, those values shown being generator outputs at various resistive loads and at an extremely low frequency of one and a half revolutions per second.

FIG. 16 is a load table of test results performed on a hand-made model of the invention utilizing a ¾ inch rotor. The table shows significant outputs achieved even without the advantages of close tolerance machining. The values are measurements taken at various resistive loads as indicated and at an extremely low frequency of one and a half revolutions per second.

While the present invention has been illustrated by description of several embodiments it is not the intention of the applicant to restrict or in any way limit the scope of the appended claims to various details mentioned. Accordingly, departures may be made from various details without departing from the spirit or scope of applicant's general inventive concept as described in the appended claims.

Having thus described the aforementioned invention, I claim:

1. A brush-less dynamo-electric device comprising:
    an ellipsoid or spherical, permanent magnet rotor having N and S pole faces of substantially uniform magnetic flux along the entire outer surface area of the shape and having a central plane of magnetic pole dissection parallel to the rotor axis;
    a stator comprises a bobbin-type, core-less, hollow through construction including pivotal support means for the axially disposed spherical rotor and having an air gap dimension there between;
    said stator bobbin further supports at least one continuous coil winding conductor having two ends for connection to a load or source of electrical current;
    the bobbin and the at least one continuous coil winding surrounds the rotor outer circumference, the coil winding is axially centered such that said rotor axis is parallel with said coil winding; and
    rotor means wherein said rotor is urged to rotate about said axis.

2. The dynamo-electric device of claim 1, wherein said pivotal support means for axially disposed rotor includes spherical bearing means for rotation of rotor about said axis.

3. The dynamo-electric device of claim 1, wherein a member is attached to the permanent magnet rotor and extends laterally through the hollow through and unobstructed side of stator bobbin.

4. The dynamo-electric device of claim 1, wherein a member is attached to the permanent magnet rotor and extends laterally through the hollow through and unobstructed side of stator bobbin and wherein said member is constrained for limited travel by additional abutment members mounted to a base member.

5. The dynamo-electric device of claim 3, wherein an additional and adjacently located magnet is pivotally mounted along an extended member to a yoke member, said adjacent magnet coupled magnetically with rotor for extended relative travel between the two extended members.

6. A brush-less dynamo-electric device comprising:
    an ellipsoid or spherical, permanent magnet rotor having N and S pole faces of substantially uniform magnetic flux along the entire outer surface area of the shape and having a central plane of magnetic pole dissection parallel to the rotor axis;
    a stator comprises a bobbin-type, core-less, hollow through construction for the axially disposed spherical rotor having an air gap dimension there between, wherein said stator and rotor are provided with a fixed shaft and bearing arrangement for rotation;
    said stator bobbin further supports at least one continuous coil winding conductor having two ends for connection to a load or source of electrical current;
    the bobbin and the at least one continuous coil winding surrounds the rotor outer circumference, the coil winding is axially centered such that said rotor axis is parallel with said coil winding; and
    rotor means wherein said rotor is urged to rotate about said axis.

7. The dynamo-electric device of claim 6, wherein said rotor means includes an additional and externally provided, magnetically coupled, moving magnet wherein first said rotor is urged to rotate about said axis.

8. The dynamo-electric device of claim 6, wherein said rotor means includes an additional and externally provided, magnetically coupled and axially rotatable magnet wherein first said rotor is urged to rotate about said axis.

9. The dynamo-electric device of claim 6, wherein said rotor means includes an additional and externally provided electromagnet.

10. The dynamo-electric device of claim 6, wherein said rotor means includes a ferrous or iron member positioned and attached proximal with said stator for causing a bias position of said rotor.

11. The dynamo-electric device of claim 6, wherein said device is a first device mounted adjacently to a second device identical to said first device, and wherein first rotor and second rotor includes a connection means between said first device and said second device for mutual cooperation and rotation about respective axis.

12. The dynamo-electric device of claim 11, wherein said connection means includes magnetic coupling.

13. The dynamo-electric device of claim 11, wherein said connection means includes a magnetically coupled additional and externally provided moving magnet wherein first rotor and second rotor are urged to rotate about respective axis.

14. A brush-less dynamo-electric device comprising:
    an ellipsoid or spherical, permanent magnet rotor having N and S pole faces of substantially uniform magnetic flux along the entire outer surface area of the shape and having a central plane of magnetic pole dissection parallel to the rotor axis;
    a stator comprises a bobbin-type, core-less, hollow through construction and supports at least one continuous coil winding conductor baying two ends for connection to a load or source of electrical current;
    stator further includes pivotal support means for the axially disposed rotor having an air gap dimension there between, said pivotal support means comprises extended or molded spherical cavity sidewalls at bobbin sides for rotor containment wherein said air gap dimension is filled with a magnetic substance having fluidity that provides a hydrostatic pressure gradient along the entire spherical surface area and along the inside spherical surface areas of the cavity containment walls for suspension of the rotor having no shall;
    rotor alignment means wherein said rotor axis is aligned parallel with the at least one coil winding as axially centered; and
    rotor means wherein said rotor is urged to rotate about said axis.

15. The dynamo-electric device of claim 14, wherein said rotor alignment means includes an additional and external positioned magnet.

16. The dynamo-electric device of claim 14, wherein said rotor alignment means includes an additional and external moving magnet.

17. The dynamo-electric device of claim 14, wherein said rotor alignment means includes an additional and external rotatable magnet having an axis of rotation.

18. The dynamo-electric device of claim 14, wherein said rotor alignment means includes an additional and external ferrous or iron member.

19. The dynamo-electric device of claim 14, wherein said rotor means for urging rotation of said rotor includes magnetic coupling with additional and external rotatable magnet having an axis of rotation.

20. The dynamo-electric device of claim 14, wherein said rotor means for urging rotation of said rotor includes magnetic coupling with the permanent magnet of an additional and proximally mounted dynamo-electric device.

* * * * *